United States Patent
Jenkins et al.

[19]

[11] Patent Number: 5,870,519
[45] Date of Patent: Feb. 9, 1999

[54] SLICE TRAY WITH AN ADAPTOR HAVING WINDOWS

[75] Inventors: Peter D Jenkins, Woodbridge; Roger E Jung, London; Brian Gregory, Canvey Island; Simon C. T. Benton, Felixstowe, all of United Kingdom

[73] Assignee: Telephone Cables Limited, United Kingdom

[21] Appl. No.: 648,032

[22] PCT Filed: Sep. 28, 1995

[86] PCT No.: PCT/GB95/02311

§ 371 Date: Jun. 28, 1996

§ 102(e) Date: Jun. 28, 1996

[87] PCT Pub. No.: WO96/10203

PCT Pub. Date: Apr. 4, 1996

[30] Foreign Application Priority Data

Sep. 28, 1994 [GB] United Kingdom ............... 9419483
Mar. 30, 1995 [GB] United Kingdom ............... 9506505

[51] Int. Cl.$^6$ ................................................ G02B 6/36
[52] U.S. Cl. ................................................ 385/135
[58] Field of Search .................................. 385/134, 135

[56] References Cited

U.S. PATENT DOCUMENTS

| | | | |
|---|---|---|---|
| 4,266,853 | 5/1981 | Hutchins et al. | 385/135 |
| 4,373,776 | 2/1983 | Purdy . | |
| 4,687,289 | 8/1987 | DeSanti . | |
| 4,793,682 | 12/1988 | Cooper . | |
| 4,840,449 | 6/1989 | Ghandeharizadeh | 385/135 |
| 5,074,635 | 12/1991 | Justice et al. . | |
| 5,119,459 | 6/1992 | Meyerhoefer et al. . | |
| 5,142,661 | 8/1992 | Grant et al. . | |
| 5,185,845 | 2/1993 | Jones | 385/135 |
| 5,206,927 | 4/1993 | Finzel et al. . | |
| 5,265,187 | 11/1993 | Morin et al. . | |
| 5,519,804 | 5/1996 | Burek et al. | 385/135 |
| 5,566,268 | 10/1996 | Radliff et al. | 385/136 |
| 5,613,029 | 3/1997 | Burek et al. | 385/134 |
| 5,631,993 | 5/1997 | Cloud et al. | 385/135 |

FOREIGN PATENT DOCUMENTS

| | | |
|---|---|---|
| 63790/94 | of 1994 | Australia . |
| 0 202 994 A1 | 11/1986 | European Pat. Off. . |
| 0 594 913 A1 | 5/1994 | European Pat. Off. . |
| 31 36 738 A1 | 3/1983 | Germany . |
| 2 176 907 | 1/1987 | United Kingdom . |
| 2 254 163 | 9/1992 | United Kingdom . |
| 2 286 060 | 8/1995 | United Kingdom . |
| WO 89/05989 | 6/1989 | WIPO . |
| WO 93/19392 | 9/1993 | WIPO . |
| WO 94/00786 | 1/1994 | WIPO . |
| WO 94/23324 | 10/1994 | WIPO . |
| WO 94/27176 | 11/1994 | WIPO . |

*Primary Examiner*—John D. Lee
*Assistant Examiner*—Ellen E. Kang
*Attorney, Agent, or Firm*—Kirschstein, et al.

[57] ABSTRACT

A splice tray for accommodating optical fibers comprises a body with a plurality of splice holders at fixed locations thereon, the body having fiber access points at which fiber can enter and leave the body. Fiber paths are provided on the body leading from the access points to and from each splice holder, and each holder is adapted to receive and hold a splice reinforcer within which a fiber splice is present. The length of fiber is accommodated on either side of the splice. An adapter is used with a clip-on power meter to take readings of the transmissivity of fibers stored on storage leaves mounted on the tray body.

22 Claims, 9 Drawing Sheets

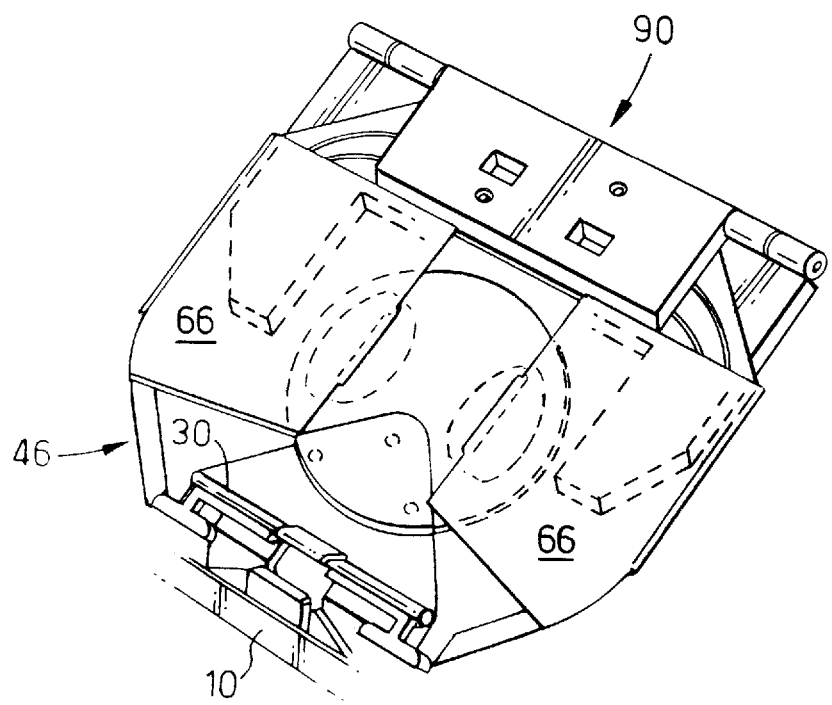

SLICE TRAY WITH AN ADAPTOR HAVING WINDOWS

BACKGROUND OF THE INVENTION

This invention relates to a splice tray for accommodating optical fibers.

Where optical fibers have to be connected to one another, a splicing technique is used. The splices have to be stored carefully and with an ample supply of fibre on either side of the splice so that the splice can, if necessary, be remade. Since fibers are normally routed in fibre bundles, it is normal for a large number of fibers to be spliced in the same physical location.

It is therefore conventional to provide a splice tray in which the splice and an associated fibre can be accommodated.

It is always desirable to reduce the volume needed for storing multiple splices, provided that this can be done without comprising the requirements of safe storage and subsequent access.

SUMMARY OF THE INVENTION

In one aspect the invention provides a splice tray for accommodating optical fibers, the tray comprising a body with a plurality of splice holders at fixed locations thereof, the body having fibre access points with which fibre can enter and leave the body, and fibre paths on the body leading from the access points to and from each splice holder, each holder being adapted to receive and hold a splice reinforcer within which a fibre splice is present, and the body being provided with means to accommodate a length of fibre of either side of the splice.

Preferably at least some of the splice holders are removably mounted at the fixed locations.

This feature permits a particularly flexible arrangement to be provided in which different types of splice and respective fibre storage arrangement may be accommodated simply by using an appropriate holder.

Preferably a fibre storage chamber is provided to accommodate lengths of fibre, and fibre paths on the body provide routes between each splice holder and the chamber. In a preferred embodiment a plurality of splice holders are arranged in a first plane on the body and the fibre storage chamber lies in a second plane beneath the first plane.

In addition an auxiliary fibre storage chamber may be provided at one end of the body.

Optical fibre associated with each splice may be stored in one of the chambers on the tray. However some of the splice holders may support a fibre storage leaf upon where fibre for the respective splice is stored. Preferably the leaf is hingedly secured to a base part.

In order to test fibre circuits without interrupting the circuit, it is known to use a socalled clip on power meter. In order to use such a meter, each single fibre has to be accurately held within a "window" of predetermined size to allow the weight to operate. It is important that provision should be made for using such a meter to test each individual fibre circuit. In another aspect the invention provides a splice tray for accommodating optical fibers, the tray comprising a body with a plurality of leaves attached to the body, the body having fibre access points at which fibre can enter and leave the body, and fibre paths on the body leading from the access point to and from each leaf, each leaf having means for receiving and retaining a splice and a length of fibre either side of the splice, wherein each leaf also has windows through the leaf material, with fibre guides on the leaf arranged so that a fibre on each side of the splice traverses one of the windows, the leaf being adapted to receive an adaptor by which a clip on power meter can be used to take readings of the transmissivity of each fibre, accessing the fibre through one of the windows. The invention also provides a method of measuring the transmissivity of an optical fibre, wherein the fibre is located on a leaf hinged to a splice tray body and the leaf has a window cut through the leaf material, the fibers on the leaf arranged so that the fibre traverses the window, the method comprising the steps of fitting an adaptor to the leaf so that a window on the adaptor registers with the window on the leaf, and connecting a clip on power meter to the adaptor to take readings or the transmissivity of the fibre.

The invention also provides an adaptor for providing an interface between a clip on power meter and a fibre storage leaf, the adaptor having windows therethrough for the operation of a meter and plates for mounting on opposite faces of the leaf to allow a meter to be brought into operating association with a fibre stored on the leaf.

The invention also provides an optical fibre clamping device for preventing relative movement between an optical fibre and a protective tube within which the fibre is located which comprises a body part including a through passageway to receive the optical fibre, the body part including the first clamp to engage the tube and a second clamp to engage the optical fibre. Preferably the device comprises a one piece moulding including two parts connected by a hinge and arranged such that closure of the device causes respective clamps to engage the tube and optical fibre.

BRIEF DESCRIPTION OF THE DRAWINGS

The invention will now be further described by way of example with reference to the accompanying drawings, in which:

FIG. 13 shows the adaptor in place and ready for a reading to be taken.

DETAILED DESCRIPTION OF THE PREFERRED EMBODIMENTS

Figure 1:
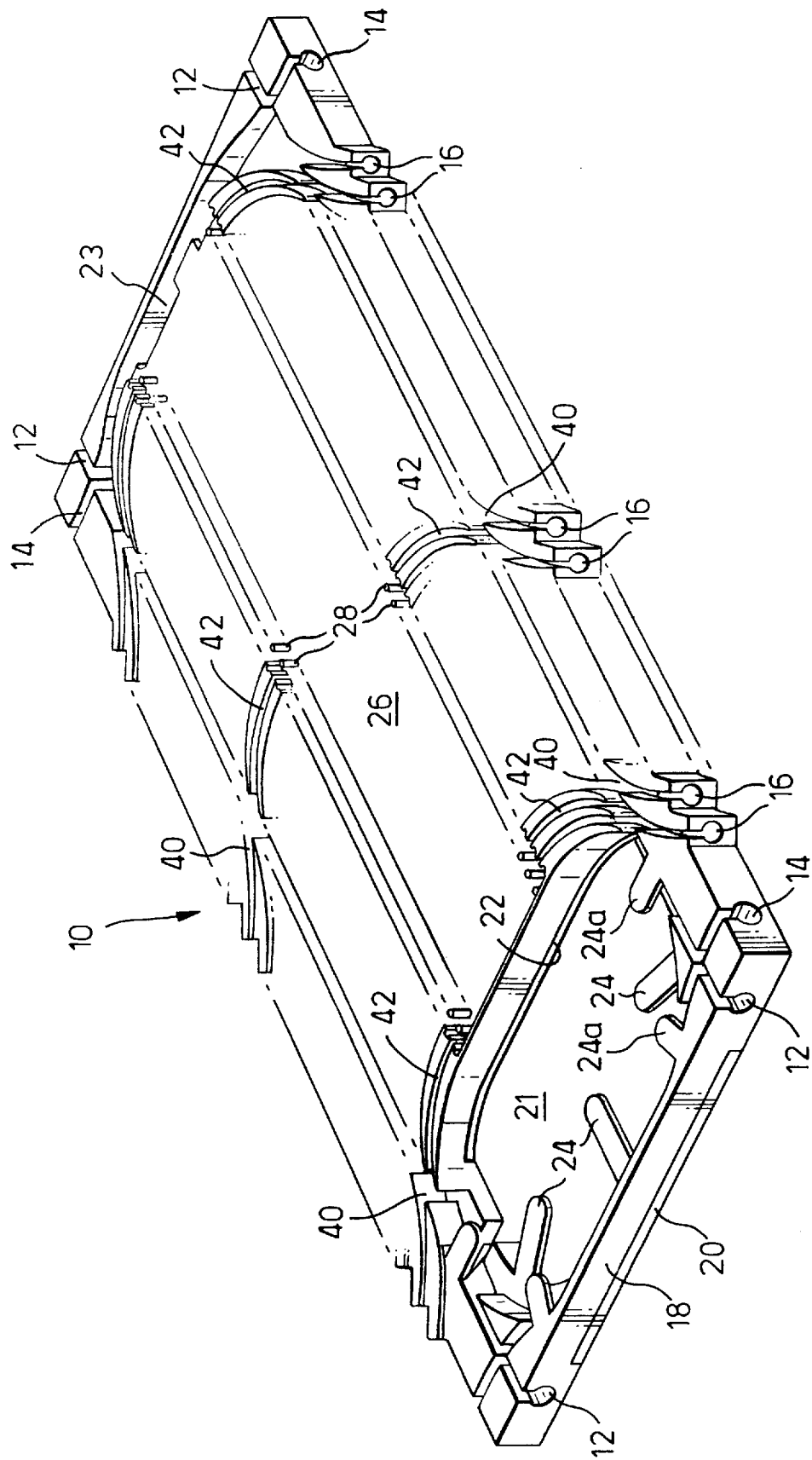
FIG. 1 is a perspective view of the body of a splice tray in accordance with the invention.

The tray body 10 shown in FIG. 1 is a plastics moulding which has fibre access ports at 12, 14 and 16. The access ports are constructed so that fibre can be laid into the ports, rather than being threaded through the ports, with a sheath 36 (FIG. 2) for the fibre or fibre bundle being axially insertable in the circular mouth of each port.

The body 10 is made up of two components, namely a main upper housing 18 and a bottom plate-like closure 20. A dark fibre pocket 22 is defined between the upper and lower components 18, 20 in which fibre which is not connected to a light source can be stored. A live fibre storage area 21 is formed at the front end of the tray.

Fibre stored in the pocket 22 or in the area 21 will expand radially, when released, as a result of its natural elasticity and will come to lie against the outer peripheral edges of the pocket or of the storage area 21. In the area 21, the fibre coils will be retained under retention fingers 24, 24a.

Figure 2:
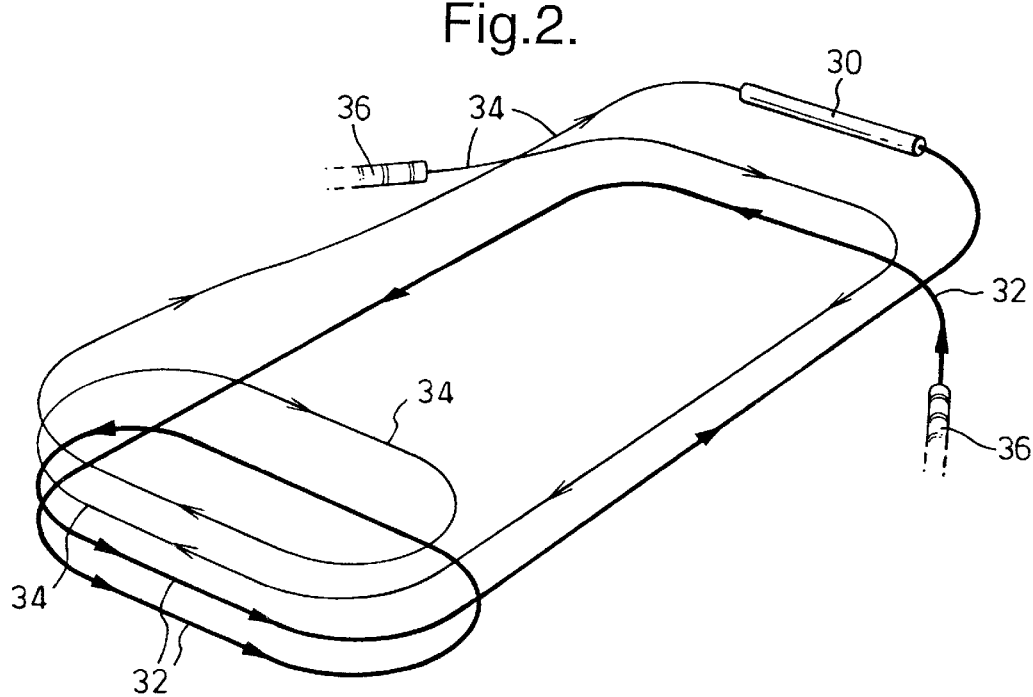
FIG. 2 shows schematically some fibre paths on the tray body.

Down the center of the upper component 18 there is a space 26 for receiving fibre splices and/or hinged single fibre loop control leaves 46 (FIGS. 3 to 10). The space 26 includes upstanding posts 28 which locate and retain splices and/or leaves. Many tracks (for example 40, 42) in which fibre may be laid are molded on the top face of the upper component 18. All the moulded fibre tracks are set up to ensure that the fibre is never bent through a radius smaller than the minimum permissible bend radius for the fiber, but a variety of fibre routes are possible within the moulded-in-tracks. For example, FIG. 2 shows two fibers 32,34 entering the tray through access ports 16 on opposite sides of the tray, and joining each other in a splice 30. One fibre 32 is shown by a thick line and the other fibre 34 is shown by a thin line. FIGS. 32 and 34 are live fibers. The thickness of these lines is purely for illustration purposes. In fact both fibers may be of the same thickness. Before they enter the tray, the fibers are protected by protective sheaths 36.

The fiber 32 first of all travels through a track 42 and crosses the upper surface of the tray through a splice holder (not shown) located on upstanding posts 28. The fibre then passes through an opposed track 42 and down the longitudinal track 40 into the pocket 21. The fibre is coiled within this pocket the necessary number of times to store the requisite length of fibre, and then the fibre is directed out of the pocket 21, passing above the fingers 24 and below fingers 24a into the second longitudinal track 40 and then into a different selected one of the curved tracks 42.

The other fibre 34 follows a similar path. The fibers are connected by a splice 30 which is made by a splicing tool, known in the art. In order to make the splice, a certain length of fibre needs to be available to the splicing tool. The splice itself is contained within a rigid, cylindrical tube and, once made, is contained within a splice holder (not shown, but mentioned above) which is retained in the space 26 by the posts 28.

This method of storing live fibre on the tray in the pocket 21 is known as multi-fibre storage. In a second configuration to be described below, live fibre can be stored in single loops, separate from other fibers.

Dark fibre which is brought onto the tray and stored there ready for use in the future passes (often as a multi-fibre bundle) from an access port 16, along a track 40 to the far end of the tray where it is coiled up and introduced into the dark fibre pocket 22 through an opening or openings 23.

Figure 3:
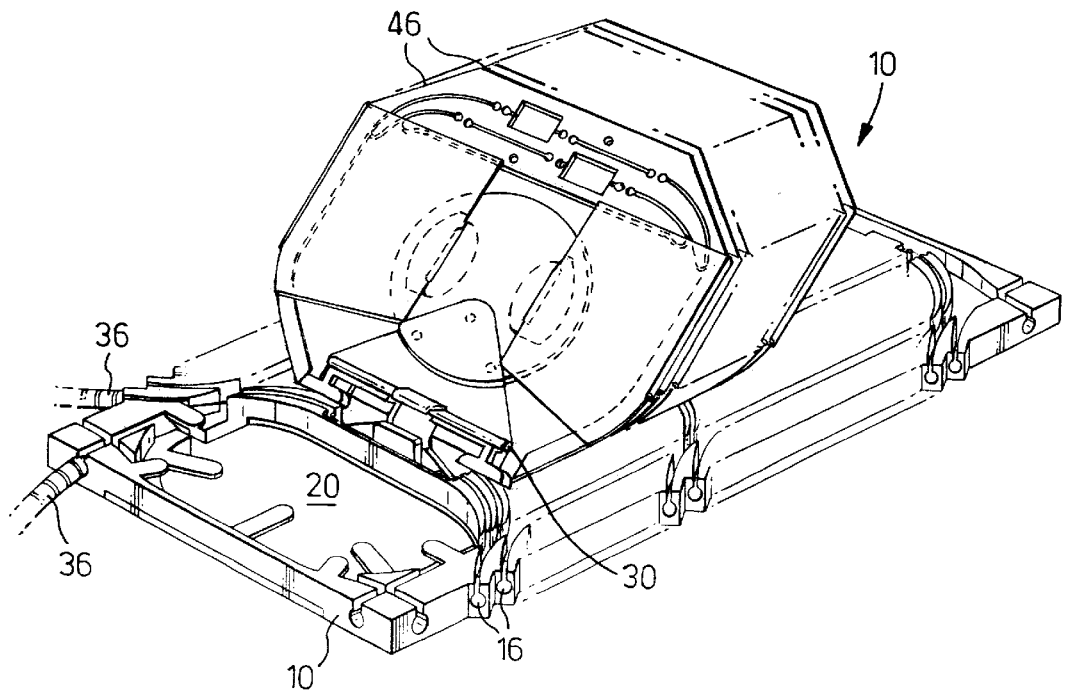
FIG. 3 is a perspective view of the body of FIG. 1 with splice holders in the form of hinged leaves mounted thereon.

FIG. 3 shows the tray 10 with a number of fibre storage leaves 46 hinged to the tray. The leaves 46 are all shown inclined backwards, in a storage position, but it will be understood that each leaf can be individually hinged about an axis parallel to the plane of the tray body 10. If access is required to a leaf 46 in the middle of the array, then the leaves in front of this desired leaf can be hinted forwards: those behind can be hinged backwards and the desired leaf can be held in an upright position so that access can be achieved to that leaf and to the fibre thereon.

Figure 4:
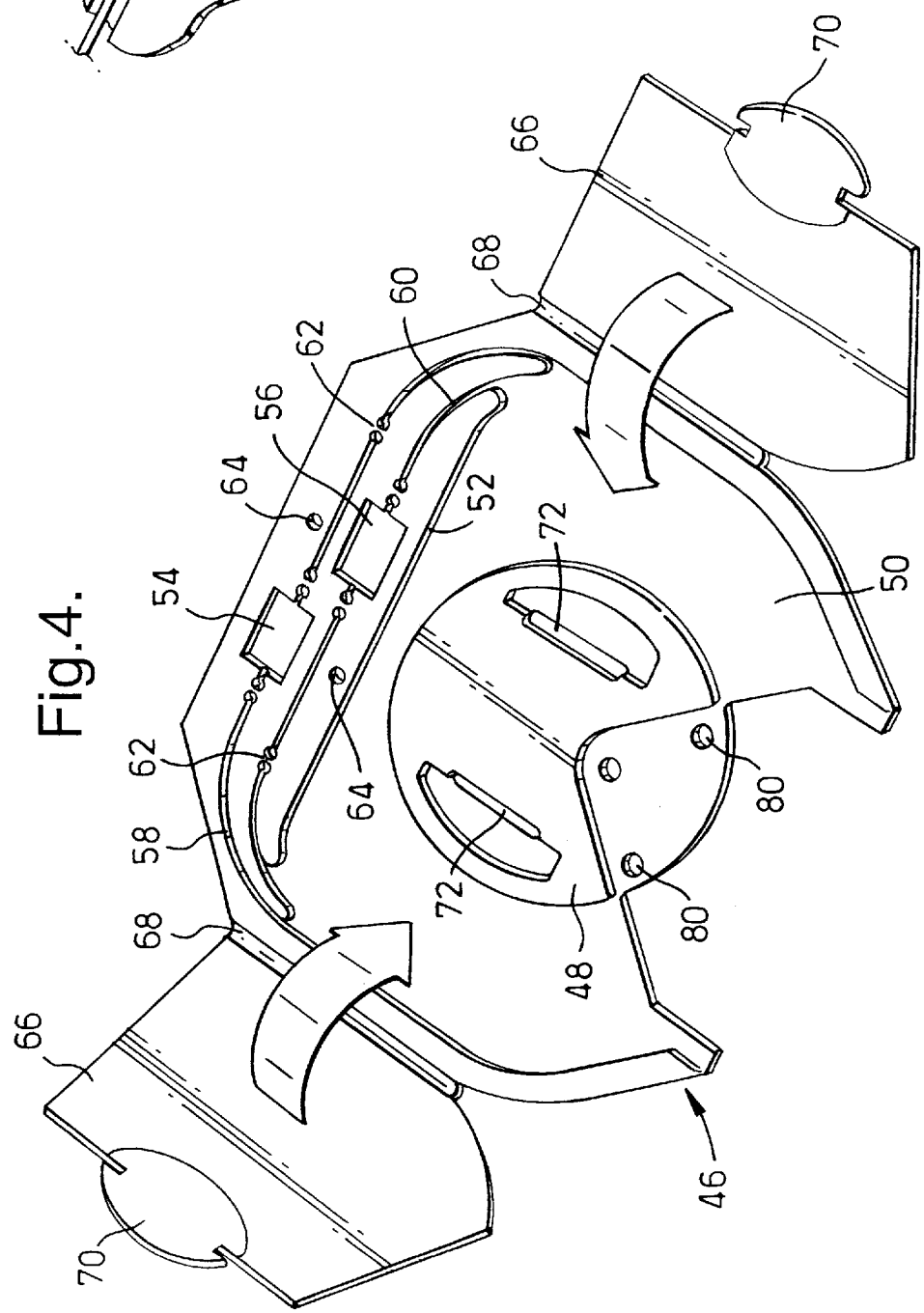
FIG. 4 shows more detail of one of the hinged leaves.

FIG. 4 shows details of one leaf 46. A loop storage part of the leaf is vacuum formed from a thin sheet plastics material. The material can be 0.4 mm thick PVC, and after vacuum forming, the depth of the leaf can be suitably 2 mm deep.

At the center, the leaf has a raised circular capstan 48, the radius of which is equal to the minimum bend radius of the fibre to be stored. A loop or fibre is held in an area generally designated 50 and, when the loop is released within this area it will naturally expand outwards against the outer walls 52 of this area.

Figure 5:
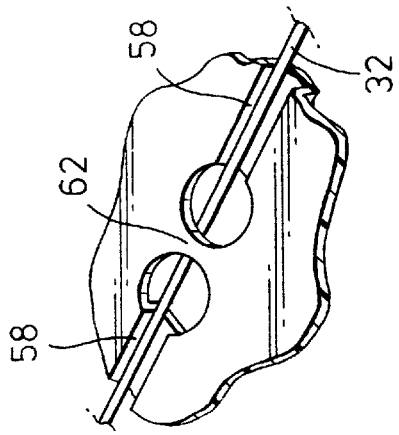
FIG. 5 is a detail of part of the fibre guide arrangement of the hinged leaf of FIG. 4.

The leaf includes two windows 54, 56 across which the fibre is to be passed. Each of the windows 54, 56 is in register with a fibre track 58, 60 and the tracks include retaining slots through which the fibers must be threaded, in line with the tracks 58, 60. These slots are shown in FIG. 5 and comprise the channels 58 which, when the leaf 46 is vacuum formed, are terminated in blank end walls. After forming, the material of the leaf is punched through to remove these blank end walls thus opening a passage beneath a bridge 62. A fibre 32 is shown passing through one of these retaining slots.

In addition to the windows 54, 56 the leaf is provided with locating holes 64 the function of which will become apparent later on.

The leaf has hinged retaining doors 66 connected by membrane hinges at 68 to the main part of the leaf. The doors have tongues 70 which can be flexed to engage in retaining apertures 72 at the center of the leaf. When the doors are closed, fibers within the leaf are retained in position.

Figure 6:
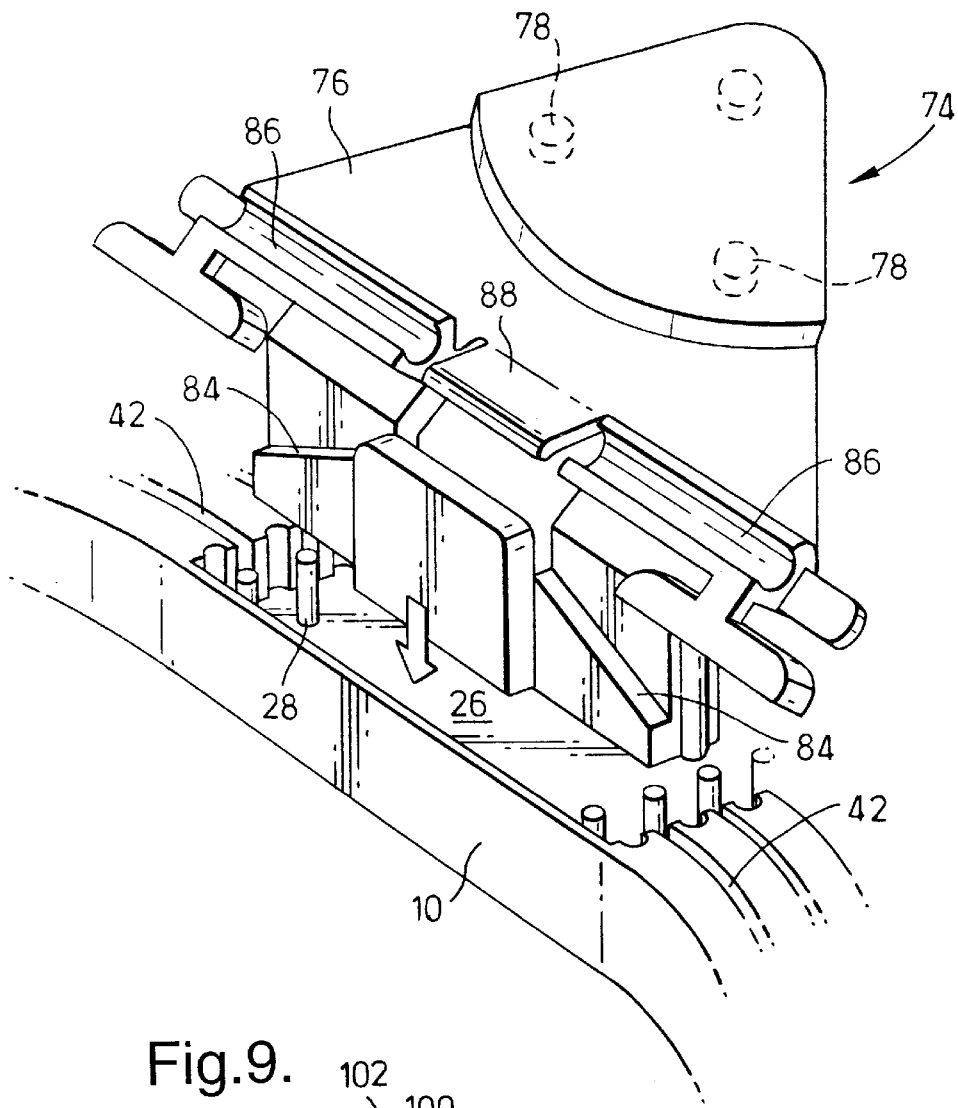
FIG. 6 shows on a larger scale the engagement between the leaf of FIG. 4 and the tray of FIG. 1.

In order to attach the leaf 46 to the body 10, a hinged, base unit 74 is used. The base unit is accommodated in the same space as a simple splice holder, when this is used in a multi-fiber storage arrangement. FIG. 6 shows, on a scale larger than that used in the preceding figures, a base unit 74. The base unit has a triangular region 76 with three studs 78 which are positioned to engage in holes 80 on the leaf 46. A permanent connection will be made between these posts and the holes, for example by sonic welding the two together.

Between the triangular portion 76 and the foot 82 of the base, there is a membrane hinge which will allow the triangular portion 76 with the attached leaf to turn about an axis parallel to the body 10. On the foot 82 are two ramps 84 which line up with the fibre tracks 42 in the body 10, when the base is fully inserted into the space 26. The ramps 84 guide the fibre from the tracks 42 up into the fibre loop control leaf 46.

Adjacent the hinge on the base 74 is a channel 86 for receiving a splice 30, and a retention tab 88 is fitted so that the splice can be snapped into the channel 86 and retained there.

Figure 7:
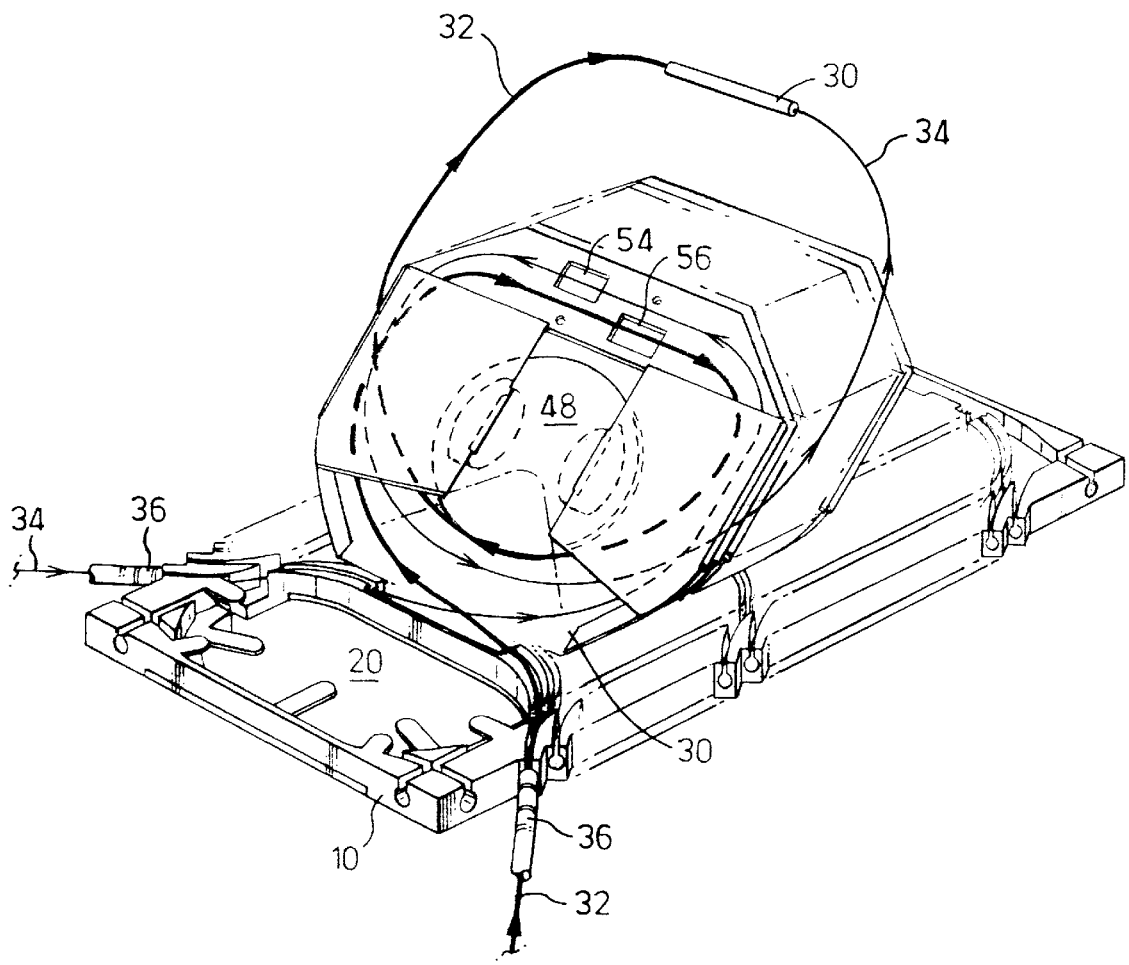
FIGS. 7 and 8 illustrate the way in which fibre is loaded onto a hinged leaf.
Figure 8:
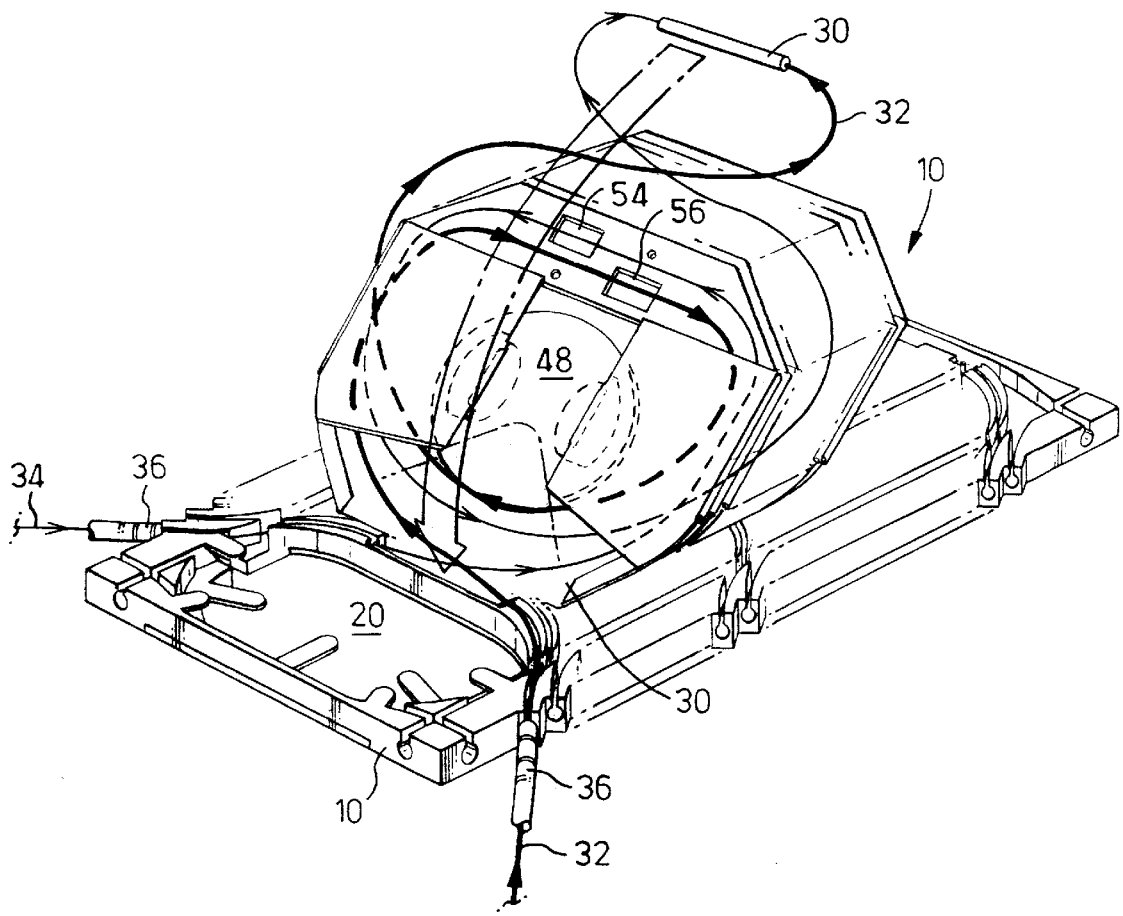

FIGS. 7 and 8 show the way in which the tray will be used to accommodate fibers. As in FIG. 2, the two fibers which will be connected together to form a single fibre loop are shown by thick 32 and thin 34 lines.

The fiber 32 comes onto the tray through a sheath 36, passes along a track 42, up a ramp 84 and onto the fibre loop control leaf 46. From there it makes a loop, the free end of the fibre 32 is guided through retention slots 62 to ensure that the orientation of the fibre with relation to the window 56 is generally as required, passes across the window 56 and around the capstan 48 before its free end is taken to a position far enough away from any obstructions to allow it to be spliced to the free end of the fibre 32.

The other fibre 34 follows a path which is similar to that of the fibre 32, but a mirror image thereof.

When the free ends of the fibers 32 and 34 meet at the location of the splice 30, they are spliced together in a known way.

Figure 12:
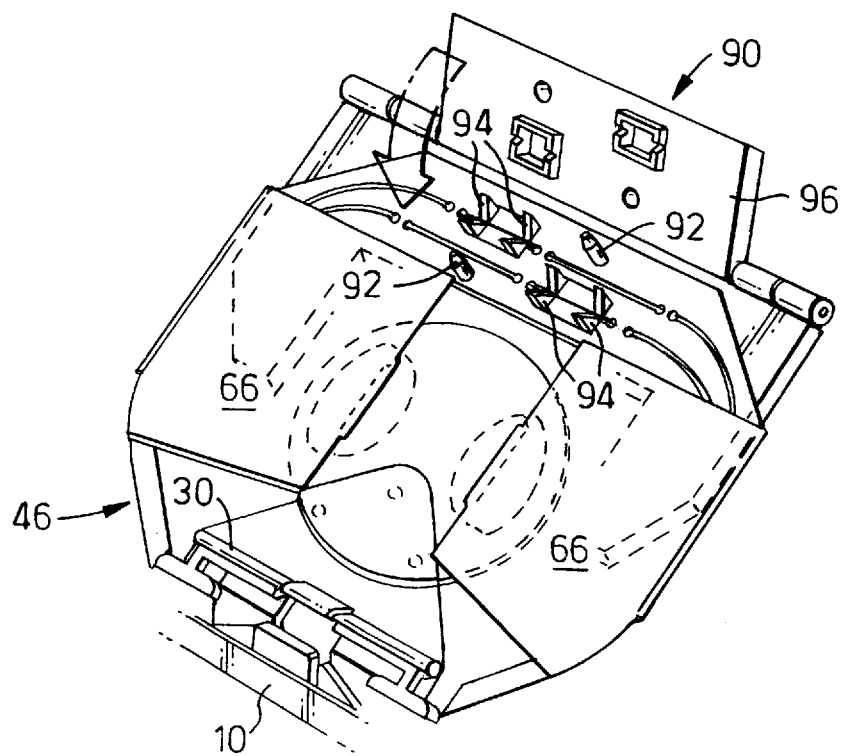
FIG. 12 shows the application of the adaptor to a hinged leaf.

Once the splice has been made the resulting fibre loop is twisted through 180° (see FIG. 8) and the splice 30 is then moved down so that it can clip in the channel 86, 88 and when this happens the spare fibre loop will locate within the fibre loop control loop 46, the door 66 of which can then be closed to retain the fibre. FIG. 12 shows the completed leaf 46 with the fibre and its splice 30 stored thereon.

Figure 9:
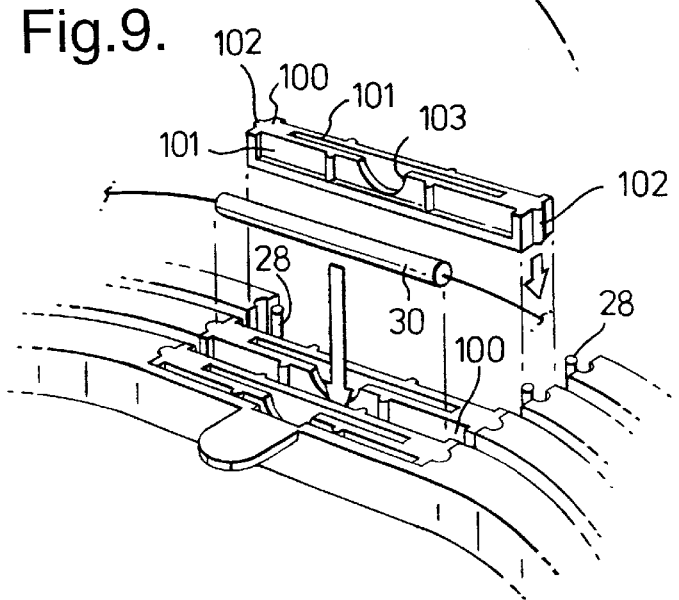
FIG. 9 is a perspective partial view of the body of a splice tray with a different type of splice holder.

FIG. 9 shows a partial perspective view of a tray together with a different type of splice holder. In this embodiment a splice reinforcer 30 is retained inbetween a space defined between two bar like retaining elements 100. Each retaining element 100 is formed from a plastics material having flexible side walls 101. A hole 102 is provided at each end of the member 100 which mates with the pegs 28 provided on the splice tray body for holding the member in position. A notch 103 is provided so that, when two such members are inserted side by side a splice reinforcer 30 inserted in the space defined between them can be removed.

Figure 10A:
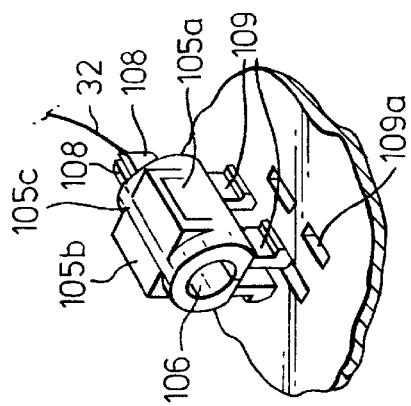
FIG. 10a is a perspective view of part of the tray shown in FIG. 10.
Figure 10:
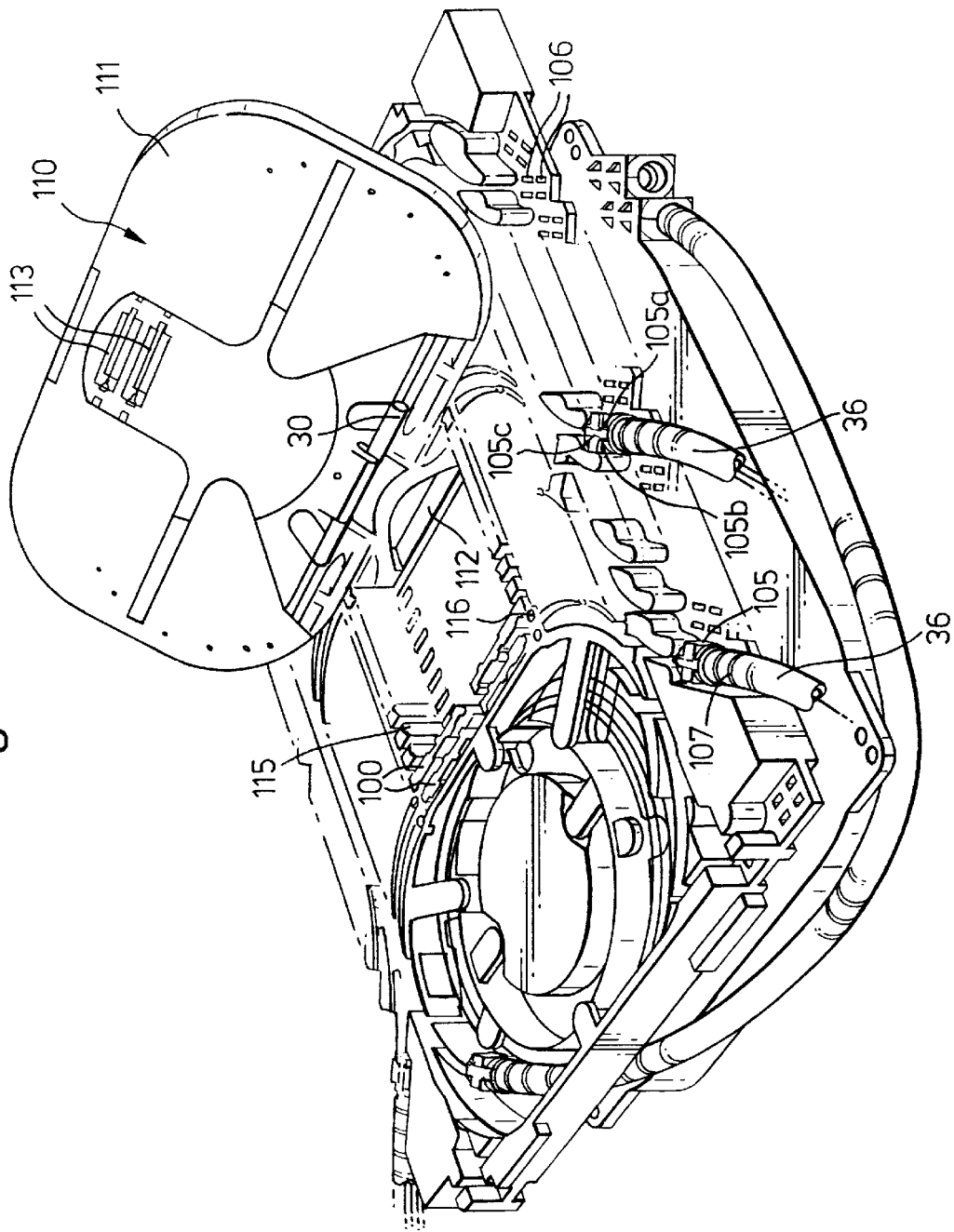
FIG. 10 is a perspective view of an alternative splice tray and splice holder arrangement.

FIG. 10 shows a different type of splice tray body of generally similar construction to that shown in FIG. 1. The protective bend limiting tubes 36 are connected to the tray body by clip like members, as described in co-pending patent application GB 9506505.8 and shown in more detail in FIG. 10*a*. Essentially each clip device 105 comprises a one piece moulding which includes two substantially identical halves 105*a*, 105*b* connected by a hinge 105*c*. The interior of the device is hollow and defines a through passageway 106. One end of the device is dimensioned to receive a protective tube 36 and to provide a means of clamping the device to that tube. The tube 36 includes axially spaced ring like grooves 107 and the device includes co-operating internal rides (not shown) to prevent the device being pulled away from the tube 36. A pair of jaws 108 are provided at the other end of the device and are arranged to gently nip the optical fibre 32 to prevent it from being pulled through the device, but without causing microbending of the fibre. The bend limiting tube 36 is secured by closing the device from an open condition around one end of the tube and such that the fibre is gripped by the clamps 108 after which the lugs 109 inserted into their respective holes 109*a*. Because of engagement of the lugs 109 in the recesses 109*a*, the tube 36 is fixed relative to the optical fibre 32 and any relative movement between them is prevented. Other means may be provided for securing the device to the tray body. As shown, two types of splice holder are provided, a simple one 100 of the type shown in FIG. 9, and also a splice holder 110 comprising a fibre storage leaf 111 hingedly attached to a base part 112. The fibre storage leaf 111 incorporates windows 113 for attachment to an adaptor for a clip-on power meter, as will be described later on. The splice holder 110 may be made by injection moulding. In a preferred embodiment both the loop storage part 111 and the base part 111 may be made as a single injection molded part.

Instead of the co-operating pea and hole arrangement or the tray body shown in FIG. 1, the body 104 contains a plurality of opposed inwardly extending convex recesses 115 which mate with correspondingly concave protrusions 116 on the splice holders. In alternative embodiments these two components may be reversed.

Figure 11:
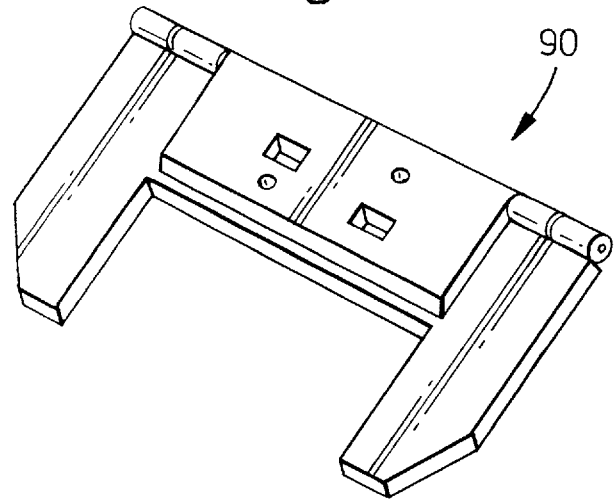
FIG. 11 shows an adaptor for adapting the leaf to the requirements of a clip on meter, before application to a leaf.

FIGS. 11, 12 and 13 show how the resulting fibre circuit is checked and measured using a clip-on power meter. Clip-on meters used for this purpose are well known in the art. These meters require a specific and accurate positioning of the fibers either side of the splice. The vacuum formed sheet which forms a leaf 46, or the injection molded leaf shown in FIG. 10 may not be able itself to provide the accurate positioning, so a separate removable jig or adaptor 90 is used for this purpose. The jig is shown in its folded condition in FIGS. 11 and 13. FIG. 12 shows the jig hinged open to be fitted onto the edge of a leaf 46. A pair of locating studs 92 project through the locating holes 64 and a pair of v-shaped guides protrude through each of the windows 54, 56. As these guides pass through the windows, so they centralise the fibre 32 or 34 so that the fibre comes to lie in an accurately controlled position across the window. The upper leaf 96 of the jig 90 is then closed to trap the fibre in position. This condition is shown in FIG. 11, and with the jig 90 arranged as shown a clip-on meter can be applied to the jig 90 to take the required readings of the fibre transmissivity. The jig 90 can be made of a precision material, for example aluminium or a high quality engineering plastic so that it can be made to precise dimensions. However only one such precisely made component is required to make it possible to take readings off each fibre leaf arranged on the tray 10, and indeed this same jig or guide can be used to take readings from other similar tray.

The tray described here with its several low volume, low cost leaves allows the separate storage of multiple single circuit via fibers so that the fibers in each individual circuit can be easily tested with a convention clip-on power meter.

The tray described can also be used with a fibre splitter. In this case, a conventional splitter arrangement can be mounted below or otherwise adjacent to the tray body 10 and the split or broken out fibers can pass onto the tray through the fibre access ports 12, 14 or 16 or through apertures (not shown) in the bottom closure 20. The fibers will then be handled on the tray as previously described.

We claim:

1. A splice tray for accommodating optical fibers, the tray comprising: a body including a plurality of splice holders at fixed locations thereon, the body having fibre access points at which the fibers enter and leave the body, and fibre paths on the body leading from the access points to and from each splice holder, each splice holder being adapted to receive and hold a splice reinforcer within which a fibre splice is present, at least some of the splice holders supporting a fibre storage leaf which is hingedly mounted to a base part of one of the splice holders, the body having means for accommodating a length of a fibre at either side of the fibre splice, a fibre storage chamber for accommodating lengths of the fibers, and additional fibre paths on the body for providing routes between each splice holder and the storage chamber.

2. The splice tray as claimed in claim 1, wherein the plurality of splice holders is arranged in a first plan on the body, and wherein the fibre storage chambers lies in a second plane beneath the first plane.

3. The splice tray as claimed in claim 2, wherein auxiliary fibre storage chamber is provided at one end of the body.

4. The splice tray as claimed in claim 1, wherein the leaf comprises a base part with a retention clip positively locating the fibre splice thereon, and a loop storage part; and wherein the base part is adapted to connect to the tray body and incorporates a hinge.

5. The splice tray as claimed in claim 4, wherein the loop storage part of the leaf is made by vacuum forming a thin plastic sheet.

6. The splice tray as claimed in claim 4, wherein the loop storage part of the leaf is made by injection molding.

7. The splice tray as claimed in claim 6, wherein the base part and the loop storage part are made as a single injection molded part.

8. The splice tray as claimed in claim 4, wherein the base part is an injection molding.

9. The splice tray as claimed in claim 4, wherein the loop storage part is formed with a shallow depression into which a fibre loop is laid.

10. The splice tray as claimed in claim 4, wherein the loop storage part is provided with doors which are closed to retain a fibre loop.

11. The splice tray as claimed in claim 10, wherein the doors are formed in one and the same vacuum forming or molding operation as the leaf itself.

12. The splice tray as claimed in claim 1, wherein at least some of the splice holders support individual fibre storage leaves, and the leaves are hinged on parallel leaf axes, with all the fibre storage leaf axes lying in a single plane.

13. A splice tray for accommodating optical fibers, the tray comprising: a body including a plurality of leaves attached to the body, the body having fibre access points at which the fibers enter and leave the body, and fibre paths on the body leading from the access points to and from each leaf, each leaf having means for receiving and retaining a splice and a length of the fibre at either side of the splice, each leaf also having windows through the respective leaf, and fibre guides on the respective leaf arranged so that the fibre at each side of the splice traverses one of the windows, at least one leaf being adapted to receive an adaptor by which a clip-on power meter is used to take readings for transmissivity of each fibre, accessing the respective fibre through one of the windows.

14. An adaptor for providing an interface between a clip-on power meter and a fibre storage leaf which forms part of a splice tray for accommodating optical fibers, the tray including a body including a plurality of splice holders at fixed locations thereon, the body having fibre access points at which the fibers enter and leave the body, and fibre paths on the body leading from the access points to and from each splice holder, each splice holder being adapted to receive and hold a splice reinforcer within which a fibre splice is present, the body having means for accommodating a length of a fibre at either side of the fibre splice, a fibre storage chamber for accommodating lengths of the fibers, and additional fibre paths on the body for providing routes between each splice holder and the storage chamber, said adaptor comprising: windows therethrough for the operation of the meter, and plates for mounting on opposite faces of the fibre storage leaf to allow the meter to be brought into operating association with a fibre stored on the fibre storage leaf.

15. The adaptor as claimed in claim 14, wherein the plates are hinged together along one edge.

16. The adaptor as claimed in claim 14, further comprising a positive location means for locating the adaptor in the correct position on the leaf.

17. A method of measuring the transmissivity of an optical fibre located on a leaf hinged to a splice tray body, the leaf having a window cut through the leaf, and fibre guides on the leaf arranged so that the fibre traverses the window, the method comprising the steps of: fitting an adaptor to the leaf so that a window on the adaptor registers with the window on the leaf; and connecting a clip-on power meter to the adaptor to take readings of transmissivity of the fibre.

18. The method as claimed in claim 17, including the step of removing the meter and the adaptor from the leaf after the reading has been taken.

19. The method as claimed in claim 17, wherein the leaf and the adaptor each have a plurality of windows.

20. A combination, comprising:
   a splice tray for accommodating optical fibers, the tray including a body having a plurality of leaves attached to the body, the body having fibre access points at which the fibers enter and leave the body, and fibre paths on the body leading from the access points to and from each leaf, each leaf having means for receiving and retaining a splice and a length of the fibre at either side of the splice, each leaf also having windows through the respective leaf and fibre guides on the respective leaf arranged so that the fibre at each side of the splice traverses one of the windows; and
   an adaptor for providing an interface between a clip-on power meter and a fibre storage leaf which forms part of the splice tray, the adaptor having windows therethrough for the operation of the meter, and plates for mounting on opposite faces of the fibre storage leaf to allow the meter to be brought into operating association with a fibre stored on the fibre storage leaf.

21. A splice tray for accommodating optical fibers, the tray comprising: a body including a plurality of splice holders at fixed locations thereon, the body having fibre access points at which the fibers enter and leave the body, and fibre paths on the body leading from the access points to and from each splice holder, each splice holder being adapted to receive and hold a splice reinforcer within which a fibre splice is present, the body having means for accommodating a length of a fibre at either side of the fibre splice, a fibre storage chamber for accommodating lengths of the fibers, and additional fibre paths on the body for providing routes between each splice holder and the storage chamber, at least some of the splice holders supporting individual storage leaves, each leaf having means for receiving and retaining the splice and the length of the fibre at either side of the splice, each leaf also having windows through the respective leaf, and fibre guides on the respective leaf being arranged so that the fibre on each side of the splice traverses one of the windows, the tray being adapted to receive an adaptor by which a clip-on power meter is used to take readings of fibre transmissivity, the fibre being accessed through one of the windows.

22. The splice tray as claimed in claim 21, wherein the windows are provided with displaceable covers.

* * * * *